United States Patent
Mueller

(10) Patent No.: US 7,068,687 B2
(45) Date of Patent: Jun. 27, 2006

(54) METHOD FOR TRANSMITTING CONCATENATED DATA SIGNALS

(75) Inventor: Horst Mueller, Hohenschaeftlam (DE)

(73) Assignee: Siemens Aktiengesellschaft, Munich (DE)

( * ) Notice: Subject to any disclaimer, the term of this patent is extended or adjusted under 35 U.S.C. 154(b) by 876 days.

(21) Appl. No.: 09/991,827

(22) Filed: Nov. 13, 2001

(65) Prior Publication Data

US 2002/0126712 A1    Sep. 12, 2002

(30) Foreign Application Priority Data

Nov. 13, 2000   (DE) ................................. 100 56 220

(51) Int. Cl.
*H04J 3/04*   (2006.01)
(52) U.S. Cl. ................ 370/536; 370/537; 370/907
(58) Field of Classification Search ............. 370/535, 370/536, 537, 542, 907
See application file for complete search history.

(56) References Cited

U.S. PATENT DOCUMENTS

| | | | | |
|---|---|---|---|---|
| 5,452,307 A * | 9/1995 | Koyama et al. | ............ | 370/468 |
| 5,878,039 A * | 3/1999 | Gorshe et al. | ............. | 370/376 |
| 6,298,038 B1 * | 10/2001 | Martin et al. | ............... | 370/216 |
| 6,493,847 B1 * | 12/2002 | Sorgi et al. | ................. | 714/800 |
| 6,870,860 B1 * | 3/2005 | Meagher et al. | ........... | 370/535 |
| 6,891,862 B1 * | 5/2005 | Brady et al. | ................ | 370/539 |

FOREIGN PATENT DOCUMENTS

| EP | 4 429 888 B1 | 2/1995 |
|---|---|---|
| EP | 0 718 996 A2 | 6/1996 |

OTHER PUBLICATIONS

A.S. Tanenbaum, Computer Networks, 3$^{rd}$ Edition, Prentice Hall International, 1996, ISBN 0-13-394248-1, Seite 125-130.

* cited by examiner

*Primary Examiner*—Chau Nguyen
*Assistant Examiner*—Anthony Sol
(74) *Attorney, Agent, or Firm*—Bell, Boyd & Lloyd LLC

(57) ABSTRACT

A method for transmitting concatenated data signals wherein an STM-256/OC-768 signal is divided into four concatenated signals which are inserted into modified STM-64/OC-192 pulse frames. The bytes of the unused information and the frame alignment words of the STM-256/OC-768 signal are not transmitted so that the total content of the STM-256/OC-768 signal, reduced by this redundant information, can be transmitted transparently in the modified STM-64/OC-192 pulse frames. The concatenated signals can be regenerated without problems.

8 Claims, 2 Drawing Sheets

METHOD FOR TRANSMITTING CONCATENATED DATA SIGNALS

BACKGROUND OF THE INVENTION

In synchronous data systems such as the synchronous digital hierarchy SDH and a corresponding system SONET, used in North America, binary data are inserted into pulse frames and transmitted. So that signals having relatively high data rates also can be transmitted via systems which only have a restricted transmission capacity, these signals are divided into a number of subsignals having a lower data rate. A corresponding arrangement is described as "inverse multiplexers" and is known, for example, from European patent application EP 0 429 888.

In the near future, it can be expected that there will be devices, for example routers, which will deliver STM-256/OC-768 signals with about 40 Gbit/s. At present, wavelength-division multiplexer systems, the individual channels of which are designed for transmission rates of 10 Gbit/s, are still being used in optical transmission technology.

It is an object of the present invention to specify a method which enables STM-256/OC-768 signals to be transmitted via 10 Gbit/s channels.

SUMMARY OF THE INVENTION

An advantage of the method according to the present invention is that pulse frames which essentially correspond to a standardized pulse frame are used for the transmission. It is only the number of frame alignment bytes which is reduced. As such, existing transmission devices only need to be modified slightly, or not at all. The pulse frame is designed in such a manner that the operation of electric regenerative repeaters is not impaired. A uniform type of regenerative repeater therefore can be provided in the network. The original signal is transmitted transparently.

Numbering of the concatenated pulse frames is also advantageous. This enables the subsignals to be detected in a simple manner at the receiving end and to be combined in an error-free manner to form the original signal.

To ensure error-free transmission even with relatively large delay differences, it is advantageous to form a superframe. This can be done by marking, for example, the first concatenated pulse frames of a superframe or by numbering all concatenated pulse frames of a superframe.

Additional features and advantages of the present invention are described in, and will be apparent from, the following Detailed Description of the Invention and the Figures.

DETAILED DESCRIPTION OF THE INVENTION

Figure 1:
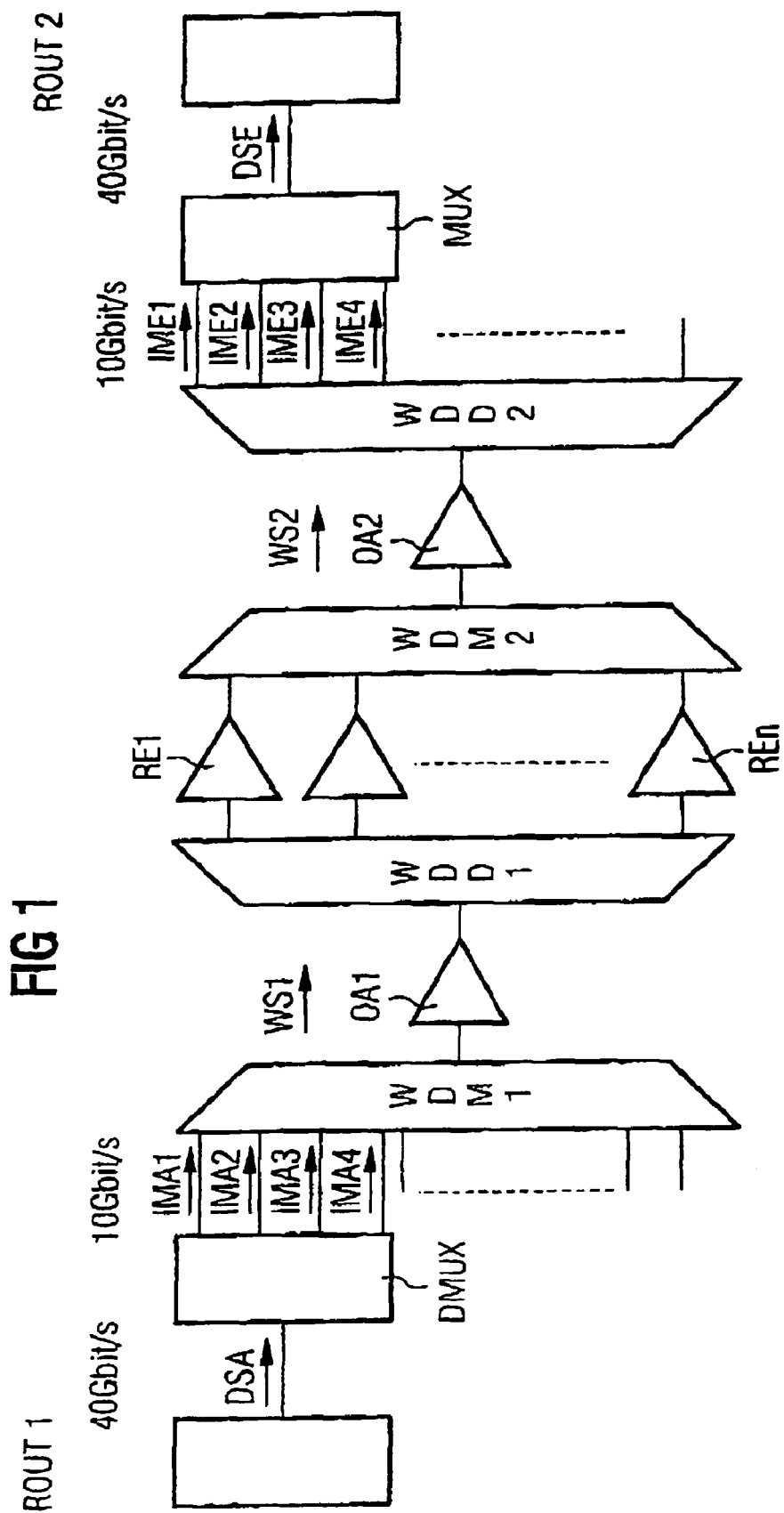
FIG. 1 shows an arrangement for carrying out the method according to the present invention.

FIG. 1 shows a possible use of the method according to the present invention. A first router ROUT1 inserts an STM-256/OC-768 signal DSA into a pulse frame PR256 (FIG. 2), delivered with a bit rate of approx. 40 Gbit/s. This signal is divided byte by byte into four concatenated subsignals IMA1 to IMA4, after omission of bytes NU, A1, A2, NU according to FIG. 2, in a demultiplexer DMUX (inverse multiplexer) so that bytes I11, I21, I31, I41, I12, I22, ... of the original 256/OC-768 signal DSA are evenly allocated to pulse frames PR64.1 to PR64.4.

The precise structure of the pulse frames STM-64/OC-192 is described in ITU recommendation G.707, page 42 and pages 54 and 55. The pulse frames PR64.1 to PR64.4 used here correspond to those of the STM-64/OC-192 pulse frames completely in format and largely in content as is shown in the right-hand half of FIG. 2. The representation is not true to scale. Each of these pulse frames has nine rows Z1 to Z9 and 17,280 columns S1, S2, ... and the time slots formed in this manner, in each case, accommodate one byte. The ITU-conformal overhead of the pulse frames PR64.1 to PR64.4, in each case, has 576 columns. A traditional overhead includes 576 columns.

In the first row of each pulse frame PR64.1 to PR64.4, frame markings A1 and A2 are transmitted, the number of A2 bytes having been reduced by 8 bytes and the frame alignment bytes A2 having been replaced by information bytes I11, I12, ... Only 384 time slots are reserved for the overhead information OH; in the remaining time slots, data of, in each case, one subsignal or, respectively, the STM-256/OC-768 signal DSA1 are transmitted as also in the (original) payload PL.

Figure 2:
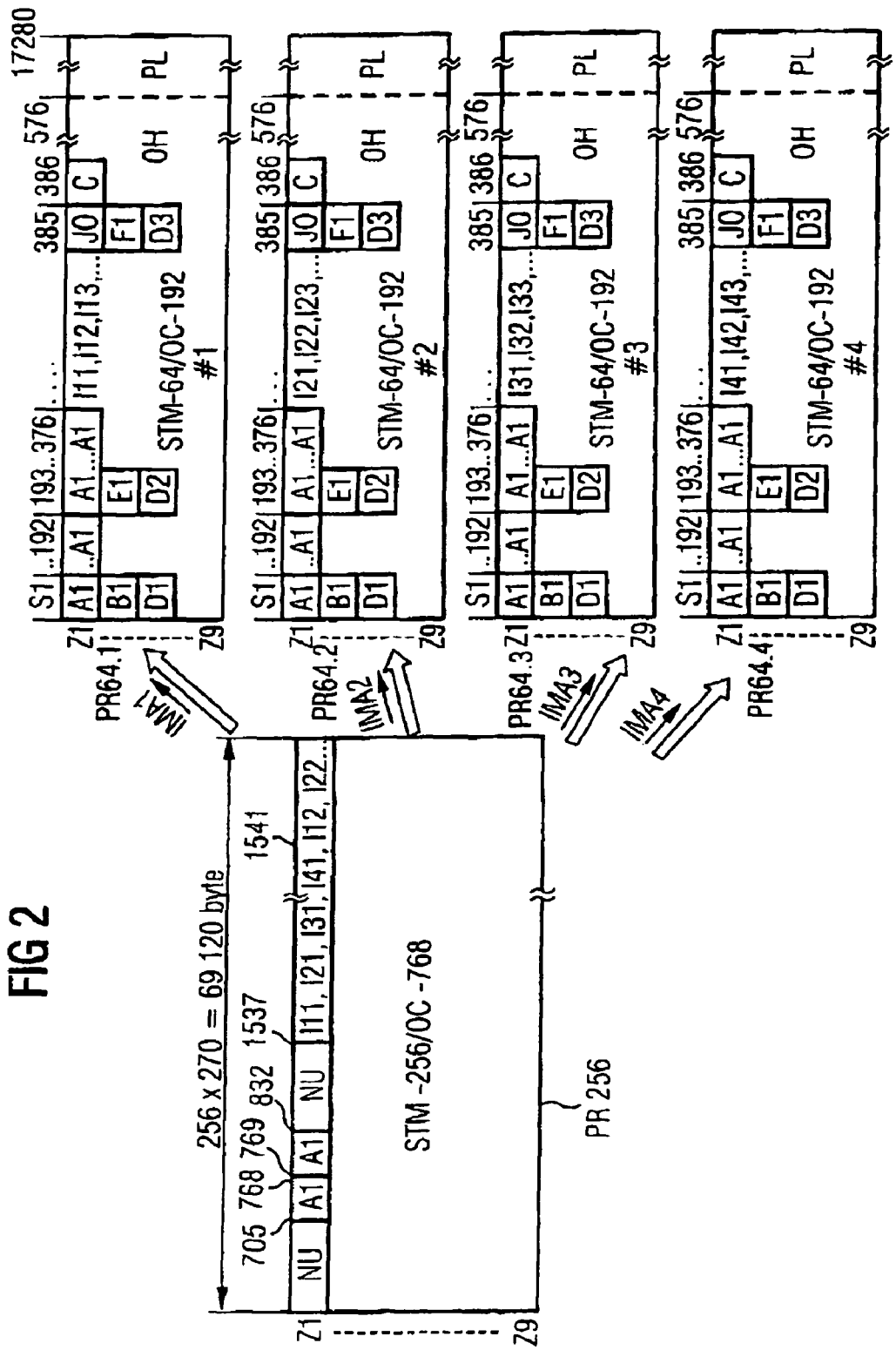
FIG. 2 shows the frame structure of the concatenated pulse frames.

The first payload byte 1537 of the STM-256/OC-768 signal or, respectively, the first byte of the subsignal IMA1, is inserted as byte I11 at position 377 in the first STM64/OC-192 pulse frame PR64.1; the payload byte 1538 of the STM-256/OC-768 signal located at position 1538 or, respectively, the first byte of subsignal IMA2, is inserted as byte I21 at position 377 of the second STM64/OC-192 pulse frame PR64.2 etc. until the byte of position 1541 is again inserted as byte I12 at position 378 of the first pulse frame PR64.1 etc. Other bytes of the signal IMA1 are inserted in the first row Z1 from column 379 to column 384 and again from column 387 etc. of pulse frame PR64.1. After that, further bytes of subsignal IMA1 are inserted in the second row from column 2 to column 192, from column 194 to column 384 and from column 386 as can be seen in FIG. 2.

The regenerative repeaters RE1 to RE4 shown in FIG. 1 only analyze the transitions between A1 and A2 for synchronization so that the reduction in the number of A2 bytes does not impair their operation. The reduction in the number of frame alignment bytes is necessary since 9×69.120–1536 bytes=620 544 bytes in total must be inserted into the four pulse frames PR64.1 to PR64.4 from the pulse frame PR256 and, in addition, eight additional bytes J0, C, B1, E1, F1, D1, D2, D3 also must be inserted into the overhead in order to generate a compatible STM-64/OC-192 pulse frame. The STM-64/OC-192 signals allocated to the concatenated subsignals IMA1 to IMA4 are additionally identified by #1 to #4.

In the basic block diagram of FIG. 1, the concatenated signals IMA1 to IMA4, together with other signals, are combined to form a transmission signal WS1 in a first wavelength-division multiplexer WDM1 and transmitted. As a rule, the transmission link contains optical amplifiers OA1 and electric regenerative repeaters RE1 to REn. The regeneration (still) requires an initial division of the transmission signal by a first wavelength-division demultiplexer WDD1 into the corresponding 10-Gbit/s signals followed by an opto-electric conversion (not shown here). After the signals have been regenerated, they are electro-optically converted and combined in a second wavelength-division multiplexer WDM2 to form the transmission signal WS2 which is forwarded via a further optical amplifier OA2 to a second wavelength-division demultiplexer WDD2 where it is reconverted into concatenated subsignals IME1 to IME4 which correspond to the subsignals IMA1 to IMA4 at the transmitting end.

In the multiplexer MUX, the regenerator section overhead inserted in the demultiplexer, bytes J0, C, B1, E1, F1, D1, D2, D3 of the concatenated signals, are in each case removed and the subsignals are mapped into the corresponding pulse frame PR256 and supplied to a second router ROUT2, again as STM-256/OC-768 signal DSE.

To be able to identify the pulse frames, they are suitably numbered which takes place in byte C. In addition, a superframe marking which can be a special binary combination can be transmitted in the C byte. Similarly, it is possible to extend consecutive numbering to the superframe. Pursuant to these measures, delay differences greater than one half frame period also can be detected and compensated for by buffers in the multiplexer MUX. An analogous facility is provided for transmitting signals in the reverse direction.

Although the present invention has been described with reference to specific embodiments, those of skill in the art will recognize that changes may be made thereto without departing from the spirit and scope of the invention as set forth in the hereafter appended claims.

The invention claimed is:

1. A method for transmitting an STM-256/OC-768 data signal having a higher byte rate than the STM-64/OC-192 data signal, the method comprising the steps of:
   dividing the data signal byte by byte into four concatenated subsignals by removing unused bytes of overhead and frame alignment bytes;
   forming modified STM-64/OC-192 pulse frames, which have a reduced number of frame alignment bytes;
   inserting the subsignals into the modified pulse frames;
   inserting a corresponding number of bytes of, in each case, one of the subsignals into each modified pulse frame instead of the frame alignment bytes no longer transmitted;
   inserting remaining bytes of the respective subsignal into unused time slots of an overhead and a payload of the modified pulse frame;
   transmitting the subsignals; and
   combining the subsignals again at a receiving end to form an STM-256/OC-768 data signal at the receiving end.

2. A method for transmitting an STM-256/OC-768 data signal as claimed in claim 1, wherein, in the overhead of the modified pulse frame, a maximum of 384 bytes are not available for transmitting data of one of the subsignals.

3. A method for transmitting an STM-256/OC-768 data signal as claimed in claim 1, wherein, apart from the frame alignment bytes, the modified pulse frames contain a further eight overhead bytes.

4. A method for transmitting an STM-256/OC-768 data signal as claimed in claim 1, the method further comprising the steps of:
   removing all unused 1536 bytes of the data of the data signal;
   reducing the number of frame alignment bytes of the modified pulse frames by at least eight bytes; and
   transmitting the data of one subsignal, instead of the at least eight bytes, beginning with the $1537^{th}$ byte of the data signal.

5. A method for transmitting an STM-256/OC-768 data signal as claimed in claim 1, wherein the modified pulse frames are provided with numbering.

6. A method for transmitting an STM-256/OC-768 data signal as claimed in claim 5, wherein a superframe is formed with an integral multiple of four modified pulse frames.

7. A method for transmitting an STM-256/OC-768 data signal as claimed in claim 5, wherein the numbering is transmitted in a C byte of each modified pulse frame.

8. A method for transmitting an STM-256/OC-768 data signal as claimed in claim 5, wherein a marking of a beginning of the superframe is transmitted in a C byte of each modified pulse frame.

* * * * *